(12) United States Patent
Takeda et al.

(10) Patent No.: US 8,606,494 B2
(45) Date of Patent: Dec. 10, 2013

(54) MAP GENERATION APPARATUS, MAP GENERATION METHOD AND COMPUTER READABLE MEDIUM

(75) Inventors: Junichi Takeda, Kanagawa (JP); Hitoshi Ikeda, Kanagawa (JP); Motofumi Fukui, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 1191 days.

(21) Appl. No.: 11/905,378

(22) Filed: Sep. 28, 2007

(65) Prior Publication Data

US 2008/0221788 A1 Sep. 11, 2008

(30) Foreign Application Priority Data

Mar. 6, 2007 (JP) ................................. 2007-056212

(51) Int. Cl.
*G06F 19/00* (2011.01)
*G06F 17/00* (2006.01)
*G06F 17/18* (2006.01)
*G06K 9/46* (2006.01)

(52) U.S. Cl.
USPC ............... 701/300; 340/995.14; 340/995.18; 382/170; 382/190; 702/180

(58) Field of Classification Search
USPC ............ 701/200, 208, 300, 1, 36, 124, 29.1; 340/990, 995.15, 995.18, 995.14; 382/100, 103, 112, 115, 116, 170, 181, 382/190; 702/127, 179, 180
See application file for complete search history.

(56) References Cited

U.S. PATENT DOCUMENTS

2003/0093432 A1  5/2003  Fujita et al.

FOREIGN PATENT DOCUMENTS

JP  A-2003-323454  11/2003
JP  A-2005-149346  6/2005

OTHER PUBLICATIONS

James A. Wise; "The Ecological Approach to Text Visualization", *Journal of the American Society for Information Science*, vol. 50, No. 13, pp. 1224-1233, 1999.
Mar. 21, 2012 Notification of Reasons for Refusal issued in Japanese Patent Application No. 2007-056212 (with translation).
Takashi Suenaga et al., "Cluster Discriminant Analysis for Feature Space Visualization", *The Journal of the Institute of Electronics, Information and Communication Engineers*, May 1, 2002, vol. 5, pp. 785-795, J85-D-2 (with partial translation).
Hitoshi Sakano et al., "High Dimension Visualization Technology", *Institute of Image Electronics Engineers of Japan Magazine*, May 25, 2003, vol. 32, No. 3, pp. 251-257 (with partial translation).
Tomoyuki Nishita, "2D Computer Graphics", New Data Processing Handbook, Nov. 25, 1995, 1st Edition, pp. 1229-1230 (with partial translation).

*Primary Examiner* — Thomas Tarcza
*Assistant Examiner* — Edward Pipala
(74) *Attorney, Agent, or Firm* — Oliff & Berridge, PLC

(57) ABSTRACT

A map generation apparatus includes an acquisition unit, a classification unit, a tentative map generation unit and a map generation unit. The acquisition unit acquires information which is a target of an analysis process. The classification unit classifies the acquired information into a plurality of types. The tentative map generation unit selects the types provided by the classifying one by one as a type in question to generate tentative map information of the information belonging to the type in question, based on (i) the information belonging to the type in question and (ii) representative information that represents at least one type other than the type in question. The map generation unit generates a map image based on the tentative map information generated for the respective types.

10 Claims, 9 Drawing Sheets

(2 of 9 Drawing Sheet(s) Filed in Color)

FIG. 3

| CLUSTER IDENTIFIER ↓ ID | REPRESENTATIVE INFORMATION (CENTER OF GRAVITY) ↓ Vc | BELONGING INFORMATION ↓ Ic |
|---|---|---|
| 1 | (a1, a2, a3 ···) | (b1, b2, b3 ···), (c1, c2, c3 ···), ··· |
| 2 | (x1, x2, x3 ···) | (y1, y2, y3 ···) ··· |
| ⋮ | ⋮ | ⋮ |

MAP FOR CLUSTER A

MAP GENERATION APPARATUS, MAP GENERATION METHOD AND COMPUTER READABLE MEDIUM

CROSS-REFERENCE TO RELATED APPLICATIONS

This application is based on and claims priority under 35U.S.C. §119 from Japanese Patent Application No. 2007-56212 filed Mar. 6, 2007.

BACKGROUND

1. Technical Field

The invention relates to a map generation apparatus, a map generation method, a map generation program and a computer readable medium storing the map generation program.

2. Related Art

In recent years, various pieces of information have been computerized and the storage amount thereof has been becoming enormous. Thus, it becomes more difficult to find valuable information from stored information and to understand the whole structure of information than previous cases.

Then, to find valuable information from such enormous information and to understand the whole structure, there is a demand for classifying the information systematically and presenting the classified information to a user. To understand such classified information through intuition, a method of visualizing the information on a graph, a map, etc., as an image in a two-dimensional or three-dimensional space is devised.

SUMMARY

According to an aspect of the invention, a map generation apparatus includes an acquisition unit, a classification unit, a tentative map generation unit and a map generation unit. The acquisition unit acquires information which is a target of an analysis process. The classification unit classifies the acquired information into a plurality of types. The tentative map generation unit selects the types provided by the classifying one by one as a type in question to generate tentative map information of the information belonging to the type in question, based on (i) the information belonging to the type in question and (ii) representative information that represents at least one type other than the type in question. The map generation unit generates a map image based on the tentative map information generated for the respective types.

BRIEF DESCRIPTION OF THE DRAWINGS

Exemplary embodiments of the invention will be described below in detail with reference to the accompanying drawings, wherein:

The patent application file contains at least one drawing executed in color. Copies of this patent or patent application publication with color drawings will be provided by the Office upon request and payment of necessary fee.

FIG. 3 is a schematic representation to show an output example of a classification result by the apparatus for generating the map image according to the exemplary embodiment of the invention;

DETAILED DESCRIPTION

Figure 1:
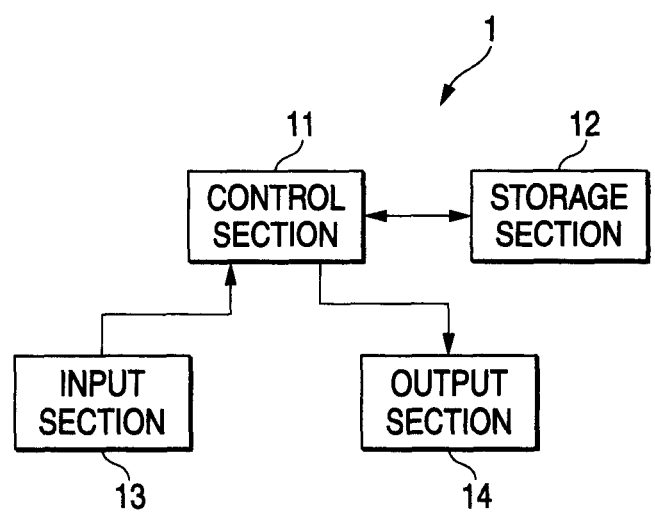
FIG. 1 is a block diagram to show a configuration example of an apparatus for generating a map image according to an exemplary embodiment of the invention.

An exemplary embodiment of the invention will be described with reference to the accompanying drawings. An apparatus for generating a map according to the exemplary embodiment of the invention is implemented by an information processing apparatus in a software manner. That is, this apparatus includes a control section 11, a storage section 12, an input section 13, and an output section 14, as illustrated in FIG. 1.

The control section 11 is a program control device such as a CPU, and operates in accordance with a program stored in the storage section 12. The control section 11 of the exemplary embodiment executes a cluster analysis process for information which is a target of the analysis process. The control section 11 selects clusters provided by executing the cluster analysis process one by one as a cluster in question to generate a tentative map image based on the information classified into the cluster in question and a representative (for example, a center of gravity) of at least one cluster other than the cluster in question. The tentative map image represents a distribution of respective pieces of information classified into the cluster in question. The control section 11 combines the tentative map images of the clusters provided by executing the cluster analysis process into one map image, and outputs the resultant map image. The specific processes performed by the control section 11 will be described later in detail.

The storage section 12 includes a memory device such as RAM (Random Access Memory) and a hard disk. The program executed by the control section 11 is stored in the storage section 12. The program may be provided in a state where it is stored in any of various computer-readable media such as an optical disk medium and a magnetic medium, and may be copied into the storage section 12 for storage. The storage section 12 also operates as a work memory of the control section 11.

The input section 13 may be a communication device for receiving information, for example, from a database. The input section 13 may contain a keyboard, a mouse, etc., for receiving user's command operation. The input section 13 outputs input information to the control section 11.

The output section 14 outputs information such as the generated map image to an outside of the apparatus 1 in accordance with a command input from the control section 11. For example, the output section 14 contains a display, etc., for displaying a map image. The output section 14 may contain a printer, etc., for printing out a map image.

Figure 2:
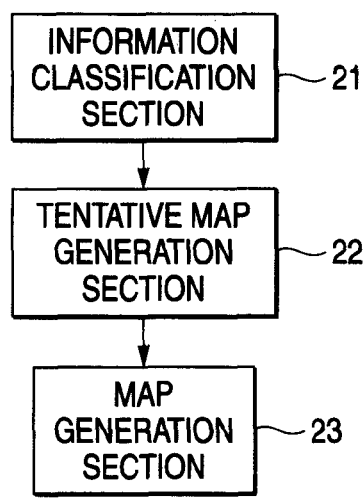
FIG. 2 is a functional block diagram to show an example of the apparatus for generating the map image according to the exemplary embodiment of the invention.

Next, the specific processes performed by the control section 11 will be described. The control section 11 of the exemplary embodiment executes the program stored in the storage section 12. Thereby, the apparatus 1 of the exemplary embodiment operates so that it functionally includes an information classification section 21, a tentative map generation section 22, and a map generation section 23 as shown in FIG. 2.

The information classification section 21 acquires information which is a target of an analysis process, and classifies the acquired information into plural types. Here, it is assumed that cluster analysis process is performed as one example of the method for classifying into plural types. The information, which is the target of the analysis process, is information relating documents, etc., stored in an external database, etc., for example, and is multidimensional vector information in which number of times each predetermined keyword appears is arranged. The information classification section 21 acquires this information through the input section 13. Alternatively, the information, which is the target of the analysis process, may be stored in the storage section 12 in advance. In this case, the information classification section 21 acquires the information, which is the target of the analysis process, by reading the information from the storage section 12.

The information classification section 21 classifies the information, which is the target of the analysis process, into plural clusters using a well-known k-means method, etc., as a cluster analysis process. As information representing the classification result, the information classification section 21 outputs an identifier (ID) of each cluster, vector information (Vc) representing a center of gravity of each cluster, and identification information (Ic) specifying information belonging to each cluster in association with each other (FIG. 3).

Figure 4:
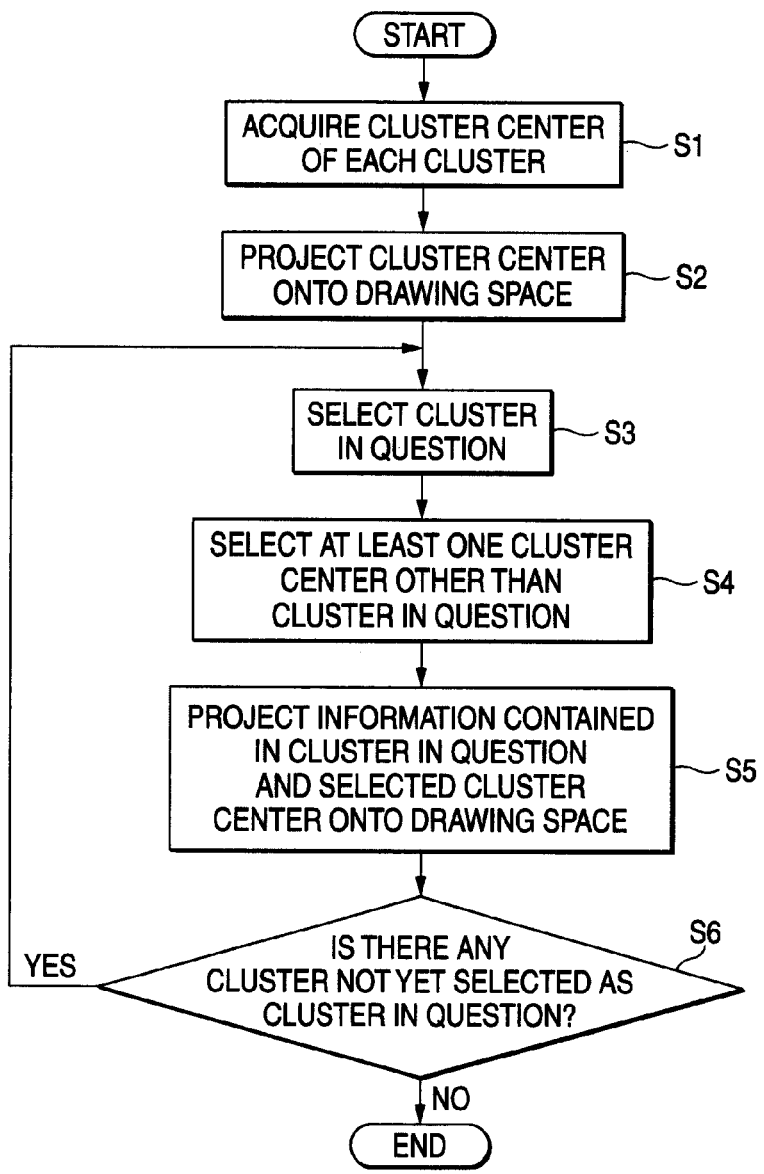
FIG. 4 is a flowchart to show an operation example of the apparatus for generating the map image according to the exemplary embodiment of the invention.

The tentative map generation section 22 starts a process shown in FIG. 4 based on the information output by the information classification section 21. That is, the tentative map generation section 22 acquires center-of-gravity information of each cluster (cluster center), for example, as representative information representing each cluster (S1).

The center-of-gravity information of each cluster can be acquired by calculating a center of gravity of the information belonging to a cluster in question.

Figure 5:
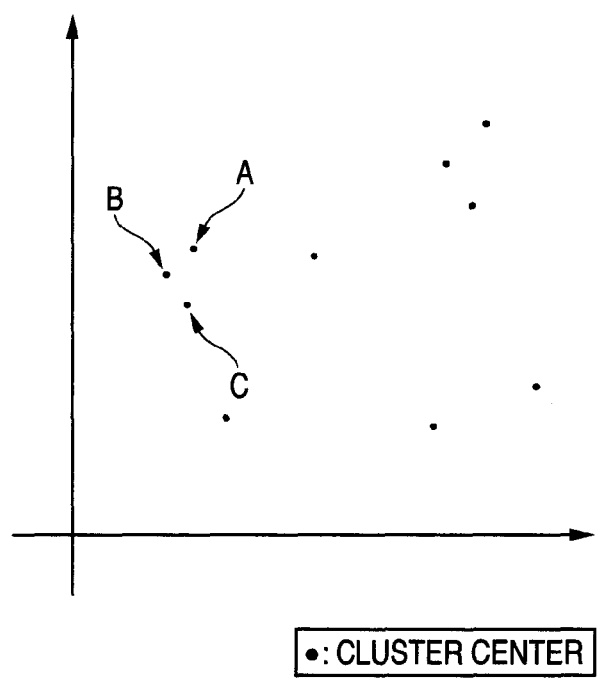
FIG. 5 is a schematic representation to show an example of a base map image generated by the apparatus according to the exemplary embodiment of the invention.

The tentative map generation section 22 projects vectors of the cluster centers onto a two-dimensional or three-dimensional space so as to preserve distances between the cluster centers acquired at step S1 (S2). This projection can be executed according to a technique of principal coordinate analysis (Gower, J. C. (1966). Some distance properties of latent root and vector methods used in multivariate analysis. Biometrika 53: 325-338.), for example. However, the projection is not limited to this method. In the following description, the case where the vectors are projected onto a two-dimensional space using the principal coordinate analysis will be described as an example. FIG. 5 shows one example of the state where the cluster centers are mapped. The map shown in FIG. 5 may be referred to as a "base map." The tentative map generation section 22 outputs the base map to the map generation section 23.

Next, the tentative map generation section 22 selects unselected one of the clusters contained in the information output by the information classification section 21 as a cluster in question (S3).

The tentative map generation section 22 selects at least one (a certain number; for example, two) cluster other than the cluster in question. For example, the tentative map generation section 22 selects representatives (center of gravities) of the certain number of other clusters in order of distances to the representative (center of gravity) of the cluster in question from the closest (shortest) (S4). The "distance" mentioned here may be a distance between the original vectors or may be a distance between vectors after projected onto the two-dimensional or three-dimensional space.

For example, in FIG. 5, it is assumed that a cluster represented by a cluster A is a cluster in question. The tentative map generation section 22 selects two cluster centers B and C in order of distance in the two-dimensional space from the closest.

Figure 6:
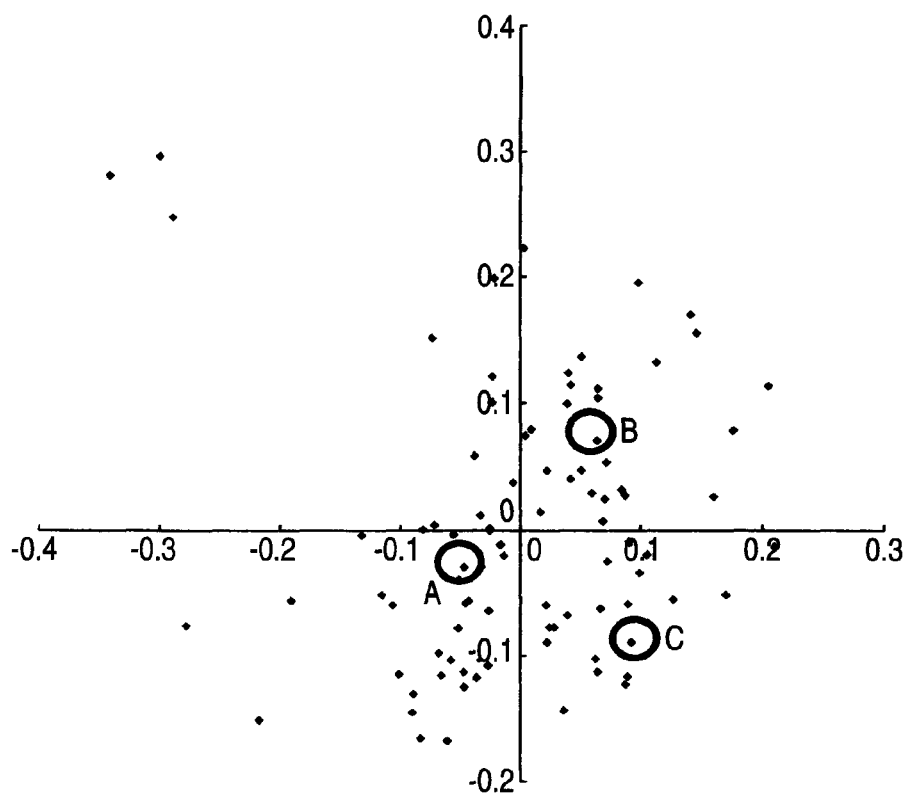
FIG. 6 is a schematic representation to show a visualization example of tentative map information generated by the apparatus according to the exemplary embodiment of the invention.

The tentative map generation section 22 uses (x+n) pieces of information consisting of information (x pieces) classified into the cluster in question and the selected cluster center information (n pieces (in this example, two pieces)), and projects the (x+n) pieces of information onto the same dimensions as the base map using the principal coordinate analysis, for example, (however, not limited to this method) so as to preserve the distances between the (x+n) pieces of information in a similar manner to step S2 (S5). Because of projection onto the two-dimensional space, if points of the respective pieces of information are drawn based on the projection result (tentative map information), a tentative map image, for example, as illustrated in FIG. 6 is obtained. Here, a direction of a triangle of A, B, C in the tentative map image is different from that of a triangle of A, B, C in the base map. However, distances among the A, B, and C points and the angle of BAC are maintained. The tentative map generation section 22 outputs the generated tentative map information to the map generation section 23. The tentative map information may include coordinate data of an information group in the cluster in question obtained by projecting the information group in the cluster in question onto a dimension which is the same as the base map. The tentative map generation section 22 also determines as to whether or not there remains a cluster not yet selected as a cluster in question (S6). If there remains a cluster not yet selected as a cluster in question, the tentative map generation section 22 returns to step S3 and continues the process.

If there remains no cluster, which has not yet been selected as a cluster in question (that is, if generation of tentative map information is complete for all clusters) at step S6, the process is terminated.

The map generation section 23 converts the tentative map information generated for each cluster by the tentative map generation section 22 into coordinates in the base map. That is, the map generation section 23 executes affine transformation for the tentative map information so that the coordinates of the representative information (center of gravity) of the cluster contained in each piece of tentative map information and the corresponding cluster representative information (center of gravity) on the base map coincide with each other. The map generation section 23 draws an image concerning the tentative map information at corresponding coordinates on the base map (coordinates with which the corresponding representative information (center of gravity) coincides) based on the tentative map information after subjected to the affine transformation. This drawing, for example, may draw a scatter diagram or may be performed by a process of counting the number of information pieces to be drawn in coordinates of each pixel block, which is predetermined in the base map, and filling each pixel block with a color in accordance with the count result.

Figure 7:
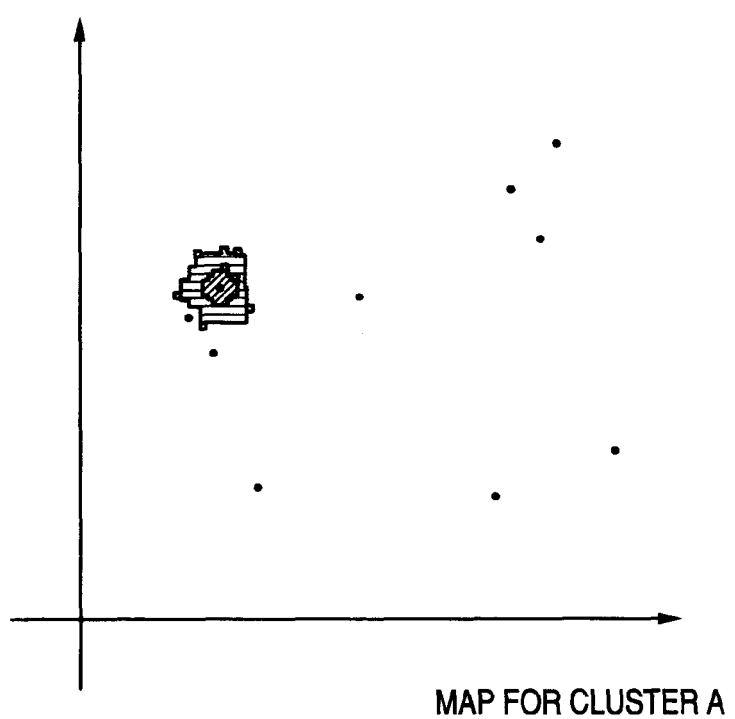
FIG. 7 is a schematic representation to show an example of a state where the tentative map information generated by the apparatus according to the exemplary embodiment of the invention is projected onto the base map image.
Figure 8:
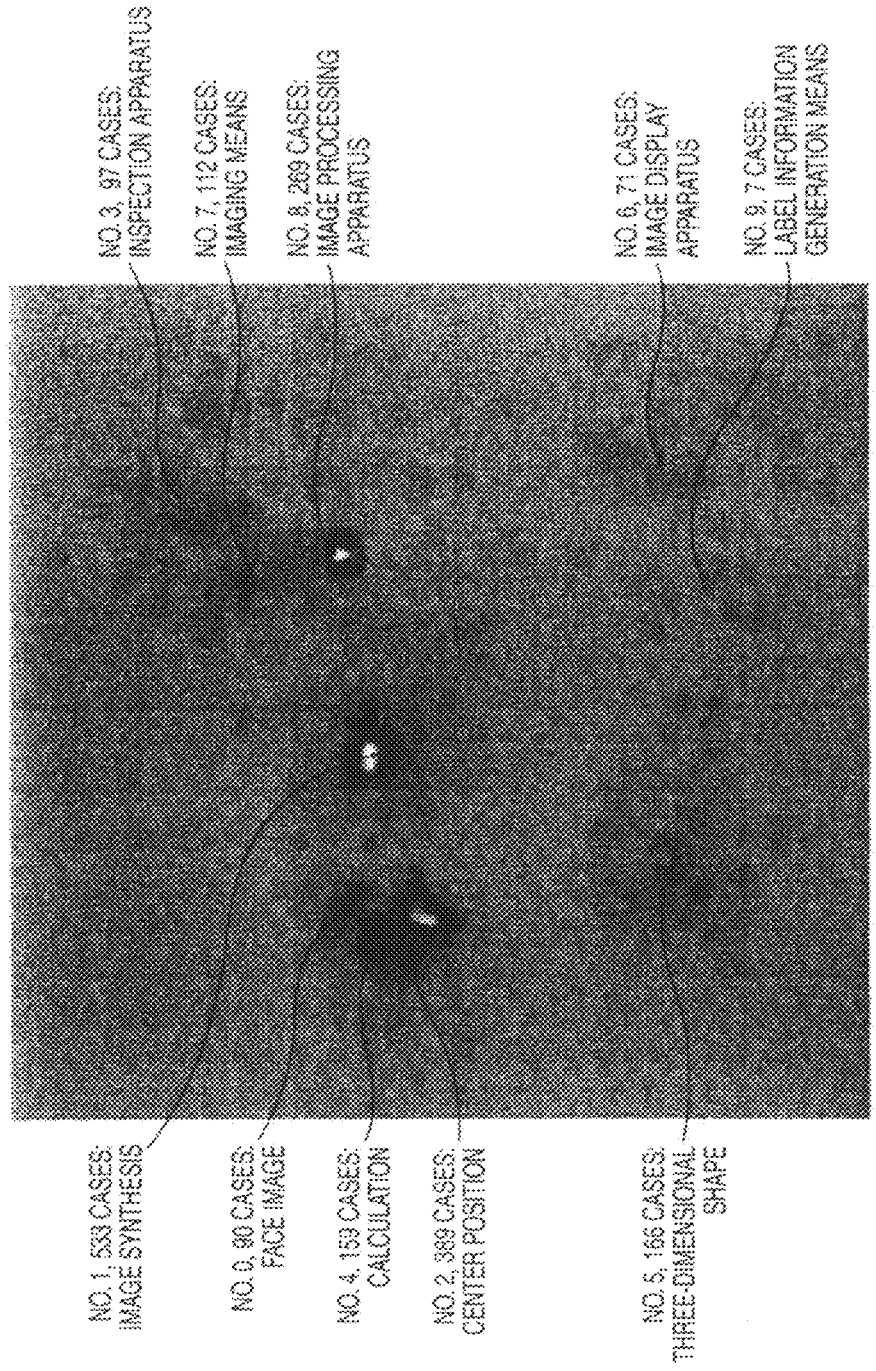
FIG. 8 is a schematic representation to show an example of a map image generated by the apparatus according to the exemplary embodiment of the invention.
Figure 9:
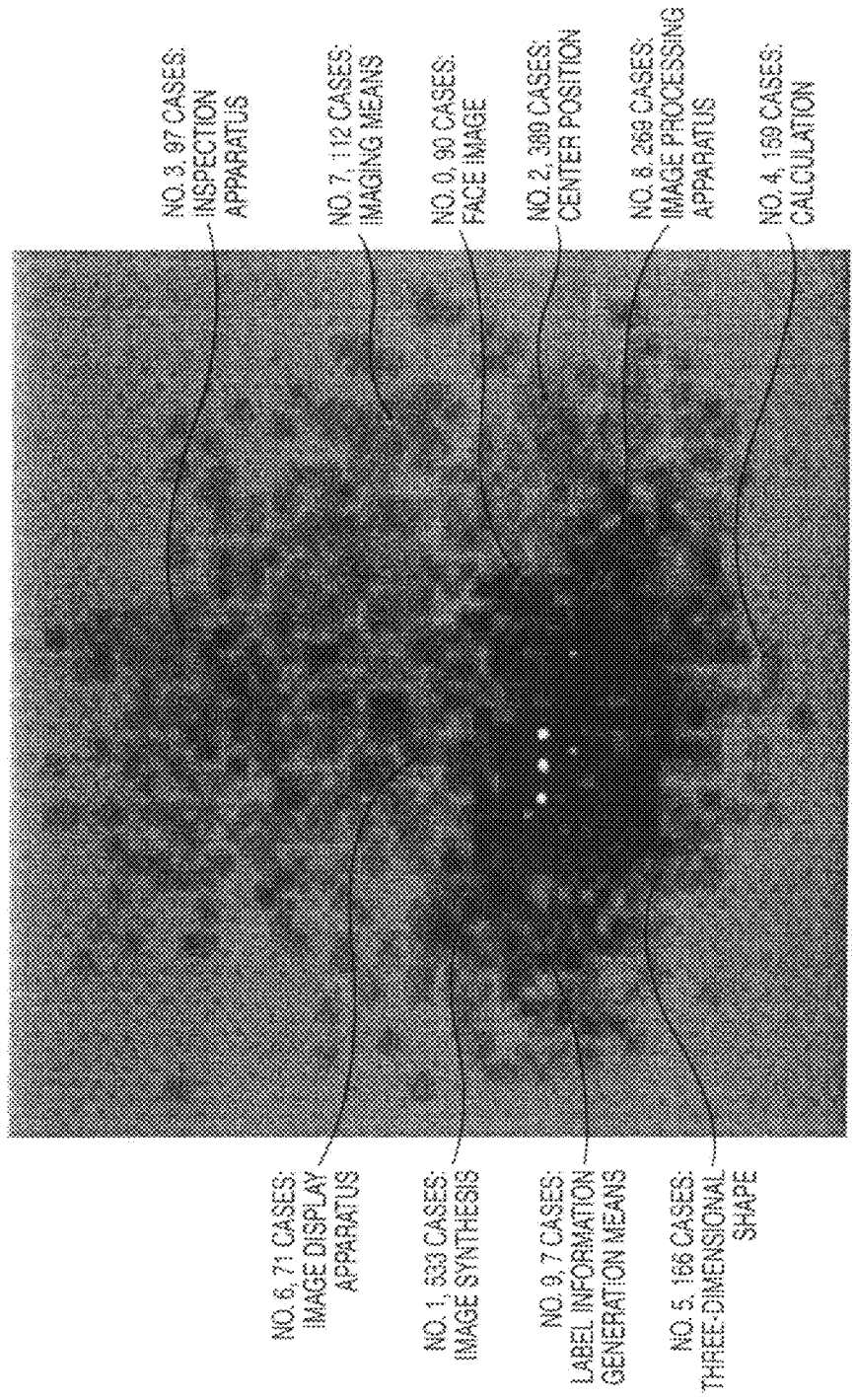
FIG. 9 is a schematic representation to show an example of a general map image.

Accordingly, an image based on the tentative map information is drawn as illustrated in FIG. 7. In FIG. 7, hatchings represent a difference in a distribution density of information when a distribution of information of a cluster A is displayed with distribution density. A horizontal-line hatching portion represents that the distribution density is low, and an oblique-line hatching portion represents that the distribution density is high. This drawn is executed for each tentative map information about each cluster, whereby a map image as illustrated in FIG. 8 is generated. For comparison, FIG. 9 illustrates a map image generated by a method not using the configuration of the exemplary embodiment. An outline of the shape of each cluster appears in the map image generated by the apparatus of the exemplary embodiment as compared with an apparatus not having the configuration of the exemplary embodiment.

The map generation section 23 outputs the generated map image to the outside through the output section 14. Alternatively, the map image may be converted into a predetermined image data format (format of JPEG: Joint Picture Experts Group, etc.,) for storage in the storage section 12 for use of the user.

In the description given so far, the tentative map generation section 22 selects a certain number of centers of gravity of clusters in order of distance to the center of gravity of the cluster in question from the closest, as plural clusters other than the cluster in question. However, the exemplary embodiment is not limited thereto. For example, the tentative map generation section 22 may select a certain number of center of gravities of clusters so that an angle subtended by (i) a segment connecting the center of gravity of the cluster in question and the center of gravity of each selected cluster and (ii) a segment connecting the center of gravity of the cluster in question and another one of the center of gravities of the selected clusters is equal to or larger than a predetermined angle. For example, the tentative map generation section 22 may select representative information (center of gravity) B and C of plural clusters so that the angle CAB in FIG. 5 is equal or larger than a predetermined threshold value. Also, in this case, if plural selection candidates meet this condition, the tentative map generation section 22 may references to distances between (i) selected B and C and (ii) the representative information A of the cluster in question (the distance between A and B and the distance between A and C) and select the center of gravity of the cluster in order of distance from the closest (shortest).

Further, the tentative map generation section 22 may select the centers of gravities of a certain number of clusters selected by a user as at least one cluster other than the cluster in question.

In the description given so far, as the information classification method, the cluster analysis method is used. However, the invention is not limited thereto. For example, a classification method based on machine learning may be used. A method of decision tree learning is known as a classification method of this kind.

In the exemplary embodiment, as described above, for each of classification items obtained as a classification result, data belonging to each classification item is projected onto a visualizable dimension (two dimensions, three dimensions, etc.,) based on analysis containing information such as representative points in any other classification item. The result of projection generated for each classification item is mapped on a map containing the whole classification items. Thereby, distances between data belonging to the respective classification items are preserved. Even if new data is added, the distances between data included so far don't change. Therefore, the whole shape of the classification items is maintained and a shape of each classification item is clarified. Also, it becomes possible to compare situation before the new data is added and that after the new data is added. In the exemplary embodiment, when tentative map information is generated for each cluster, projection is executed considering information of other clusters. Thereby, a map is formed also considering the distances from all cluster centers through the information of other clusters.

What is claimed is:

1. A map generation apparatus comprising:
   an acquisition unit that acquires information which is a target of an analysis process;
   a classification unit that classifies the acquired information into a plurality of types;
   a tentative map generation unit that selects the types provided by the classifying one by one as a type in question to generate tentative map information of the information belonging to the type in question, based on (i) the information belonging to the type in question and (ii) representative information that represents at least one type other than the type in question; and
   a map generation unit that generates a map image based on the tentative map information generated for the respective types,
   wherein the tentative map generation unit selectively uses plural pieces of representative information of a certain number of types as the representative information representing the at least one type other than the type in question so that an angle subtended by (i) a segment connecting representative information of the type in question and each of the certain number of representative information and (ii) a segment connecting the representative information of the type in question and another one of the certain number of representative information is equal to or larger than a predetermined angle.

2. The apparatus according to claim 1, wherein the information, which is the target of the analysis process, is multi-dimensional-vector information relating to documents.

3. The apparatus according to claim 1, wherein the representative information of the at least one type other than the type in question includes a center of gravity of the at least one type.

4. The apparatus according to claim 1, wherein the tentative map generation unit selectively uses plural pieces of representative information of a certain number of types in order of a distance to representative information of the type in question from the closest, as the representative information representing the at least one type other than the type in question.

5. The apparatus according to claim 1, wherein the tentative map generation unit selectively uses representative information of a certain number of types selected by a user as the representative information representing the at least one type other than the attention type.

6. The apparatus according to claim 1, wherein the tentative map information is a tentative map.

7. A map generation method comprising:
   acquiring, by a processor, information which is a target of an analysis process;
   classifying, by the processor, the acquired information into a plurality of types;
   selecting, by the processor, the types provided by the classifying one by one as a type in question to generate tentative map information of the information belonging to the type in question, based on (i) the information belonging to the type in question and (ii) representative information that represents at least one type other than the type in question; and generating, by the processor, a map image based on the tentative map information generated for the respective types, wherein the generating of the tentative map further comprises using plural pieces of representative information of a certain number of types as the representative information representing the at least one type other than the type in question so that an angle subtended by (i) a segment connecting representative information of the type in question and each of the certain number of representative information and (ii) a segment connecting the representative information of the type in question and another one of the certain number of representative information is equal to or larger than a predetermined angle.

8. The method according to claim 7, wherein the tentative map information is a tentative map.

9. A non-transitory computer readable medium storing a program causing a computer to execute a process for map generation, the process comprising:

acquiring information which is a target of an analysis process;

classifying the acquired information into a plurality of types;

selecting the types provided by the classifying one by one as a type in question to generate tentative map information of the information belonging to the type in question, based on (i) the information belonging to the type in question and (ii) representative information that represents at least one type other than the type in question; and generating a map image based on the tentative map information generated for the respective types, wherein the generating of the tentative map further comprises using plural pieces of representative information of a certain number of types as the representative information representing the at least one type other than the type in question so that an angle subtended by (i) a segment connecting representative information of the type in question and each of the certain number of representative information and (ii) a segment connecting the representative information of the type in question and another one of the certain number of representative information is equal to or larger than a predetermined angle.

10. The computer readable medium according to claim 9, wherein the tentative map information is a tentative map.

* * * * *